(12) United States Patent
Harrington (10) Patent No.: US 8,930,563 B2
(45) Date of Patent: Jan. 6, 2015

(54) SCALABLE AND EXTENDABLE STREAM PROCESSING

(75) Inventor: Timothy Harrington, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 153 days.

(21) Appl. No.: 13/282,483

(22) Filed: Oct. 27, 2011

(65) Prior Publication Data

US 2013/0111054 A1    May 2, 2013

(51) Int. Cl.
*H04L 29/06* (2006.01)
*H04L 29/08* (2006.01)
*H04L 12/24* (2006.01)
*G06F 15/16* (2006.01)

(52) U.S. Cl.
CPC .............. *H04L 65/605* (2013.01); *G06F 15/16* (2013.01); *H04L 67/1031* (2013.01); *H04L 41/145* (2013.01); *H04L 67/2833* (2013.01); *H04L 67/2838* (2013.01)
USPC ............ 709/231; 709/200; 709/226; 370/396

(58) Field of Classification Search
CPC ... G06F 15/16; H04L 67/1031; H04L 41/145; H04L 65/605
USPC ............................. 709/231, 200, 226; 370/396
See application file for complete search history.

(56) References Cited

U.S. PATENT DOCUMENTS

| | | | |
|---|---|---|---|
| 5,402,416 A * | 3/1995 | Cieslak et al. | 370/236 |
| 6,151,636 A * | 11/2000 | Schuster et al. | 709/247 |
| 6,226,441 B1 * | 5/2001 | Hartung et al. | 386/314 |
| 6,538,656 B1 | 3/2003 | Cheung et al. | |
| 6,868,083 B2 * | 3/2005 | Apostolopoulos et al. | 370/392 |
| 7,106,696 B1 | 9/2006 | Lim et al. | |
| 7,287,106 B2 | 10/2007 | Wu | |
| 7,640,239 B2 * | 12/2009 | Britton et al. | 1/1 |
| 7,664,027 B2 | 2/2010 | Norton et al. | |
| 7,698,131 B2 * | 4/2010 | Bennett | 704/215 |

(Continued)

FOREIGN PATENT DOCUMENTS

WO    WO 2006010003 A2 *    1/2006

OTHER PUBLICATIONS

Hristova et al., "Efficient Trust Management Policy Analysis from Rules", 2007.*

(Continued)

*Primary Examiner* — Ondrej Vostal
(74) *Attorney, Agent, or Firm* — Dave Ream; Jim Ross; Micky Minhas (57) ABSTRACT

An extensible architecture that enables developers to focus solely on the domain-specific nature of the stream processing algorithm to be implemented. It is positioned as an intermediary component between streaming data feeds and stream algorithms, thereby aggregating demand on data sources and hiding the complexity involved in managing active connections to different data sources. Per-algorithm stream throttling is provided so that individual algorithms do not get overloaded; thus, ensuring that algorithms receive fresh items from the data feeds to which the algorithms subscribe. Feed items can be discarded when an algorithm is not able to process the items in realtime to ensure that feed items are sampled at the fastest processing rate of the algorithm. Thus, a single instance of an algorithm can handle an entire data stream. Moreover, redundancy can be achieved by running the same configuration on multiple machines.

19 Claims, 6 Drawing Sheets

(56) References Cited

U.S. PATENT DOCUMENTS

| | | | |
|---|---|---|---|
| 7,747,796 | B1 | 6/2010 | Kumar et al. |
| 7,761,602 | B1* | 7/2010 | Knight et al. ............... 709/246 |
| 7,774,491 | B2 | 8/2010 | Alvarez et al. |
| 7,839,766 | B1* | 11/2010 | Gardner ..................... 370/218 |
| 7,865,610 | B2* | 1/2011 | Schmid et al. ............... 709/232 |
| 8,356,324 | B2* | 1/2013 | Rajakarunanayake ......... 725/88 |
| 8,370,496 | B1* | 2/2013 | Marr ........................... 709/226 |
| 8,539,094 | B1* | 9/2013 | Marr ........................... 709/235 |
| 2002/0159390 | A1* | 10/2002 | Wen et al. ................... 370/235 |
| 2003/0028387 | A1* | 2/2003 | Kilbank ....................... 704/500 |
| 2003/0093572 | A1* | 5/2003 | Laux et al. ................... 709/250 |
| 2003/0200326 | A1* | 10/2003 | Leighton et al. ............ 709/231 |
| 2005/0002377 | A1* | 1/2005 | De Boeck .................... 370/351 |
| 2005/0119896 | A1* | 6/2005 | Bennett et al. ............ 704/270.1 |
| 2005/0190794 | A1* | 9/2005 | Krause et al. ................ 370/485 |
| 2006/0088063 | A1* | 4/2006 | Hartung et al. .............. 370/498 |
| 2007/0121678 | A1* | 5/2007 | Brooks et al. ................ 370/505 |
| 2008/0040498 | A1* | 2/2008 | Setlur et al. ................. 709/231 |
| 2008/0052404 | A1* | 2/2008 | Leighton et al. ............ 709/231 |
| 2008/0181108 | A1* | 7/2008 | Hashmi et al. .............. 370/231 |
| 2008/0228936 | A1* | 9/2008 | Schmid et al. ............... 709/232 |
| 2008/0282299 | A1* | 11/2008 | Koat et al. .................... 725/93 |
| 2009/0100014 | A1 | 4/2009 | Gedik et al. |
| 2009/0138616 | A1* | 5/2009 | Alvarez et al. .............. 709/235 |
| 2010/0177776 | A1* | 7/2010 | Crinon et al. ................ 370/394 |
| 2010/0325299 | A1* | 12/2010 | Rao et al. .................... 709/230 |
| 2011/0088039 | A1* | 4/2011 | Tabone et al. ............... 718/104 |
| 2011/0112952 | A1* | 5/2011 | Annunziata et al. .......... 705/37 |
| 2011/0113282 | A1* | 5/2011 | De Spiegeleer et al. ..... 714/6.13 |
| 2011/0212717 | A1* | 9/2011 | Rhoads et al. ............... 455/420 |
| 2011/0238734 | A1* | 9/2011 | Curry et al. ................. 709/203 |
| 2011/0252063 | A1* | 10/2011 | Isaacson et al. ............. 707/780 |
| 2011/0258288 | A1* | 10/2011 | Dekel et al. ................. 709/217 |
| 2011/0295078 | A1* | 12/2011 | Reid et al. .................... 600/300 |
| 2012/0023504 | A1* | 1/2012 | Noam et al. ................. 718/105 |
| 2012/0124478 | A1* | 5/2012 | King et al. .................... 715/738 |
| 2012/0131219 | A1* | 5/2012 | Brannon, Jr. ................. 709/231 |
| 2012/0147274 | A1* | 6/2012 | Hassan et al. ............... 348/729 |
| 2012/0269354 | A1* | 10/2012 | Doherty et al. ................ 381/56 |
| 2013/0042015 | A1* | 2/2013 | Begen et al. ................. 709/231 |
| 2013/0080842 | A1* | 3/2013 | Peacock ......................... 714/48 |

OTHER PUBLICATIONS

Stojanovic et al., "Continuous Range Query Processing for Network Contrained Mobile Objects", 2006.*
Wenger et al., "RTP Payload Format for H.264 Video", 2005.*
King et al., "Metadata browser", WO2010119288A1, Apr. 2010.*
Li et al., "An Adaptive Method for Identifying Heavy Hitters Combining Sampling and Data Streaming Counting", 2010.*
Shanmugasundaram et al., "Nabs: A System for Detecting Resource Abuses via Characterization of Flow Content Type", 2004.*
Babcock, et al., "Operator Scheduling in Data Stream Systems", Retrieved at <<http://citeseerx.ist.psu.edu/viewdoc/download-?doi=10.1.1.60.2125&rep=rep1&type=pdf>>, , Proceedings: VLDB Journal, 13(4), Dec. 2004.

* cited by examiner

SCALABLE AND EXTENDABLE STREAM PROCESSING

BACKGROUND

There are many interesting data streams in search, for example, messages generated by users of social networks. Systems that process such streams (e.g., for trend detection) are difficult to implement, since the data rates fluctuate and are continually growing. This combined with the difficulty of parallelizing algorithms makes scalability and reliability a challenging issue to solve.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

An extensible architecture is disclosed that enables developers to focus solely on the domain-specific nature of the stream processing algorithm to be implemented. The architecture is a scalable generic framework that enables the rapid development and hosting of stream processing algorithms. It is positioned as an intermediary component between streaming data feeds and stream algorithms, thereby aggregating demand on data sources and hiding the complexity involved in managing active connections to different data sources.

The architecture provides per-algorithm stream throttling so that individual algorithms do not get overloaded, thus, ensuring that algorithms receive fresh items from the data feeds to which the algorithms subscribe. Feed items can be discarded when an algorithm is not able to process the items in realtime. In other words, for each algorithm, the feed items are sampled at the fastest processing rate of the algorithm. This throttling mechanism eliminates the need to achieve scalability by parallelizing the algorithm. Thus, a single instance of an algorithm can handle an entire data stream. Moreover, redundancy can be achieved by running the same configuration on multiple machines.

The flexible nature of the architecture enables algorithms to have multiple inputs and multiple outputs. Inputs can be data feeds or the output of other algorithms, for example. The data feeds and algorithm implementation are treated as plug-ins, thereby enabling developers to utilize the system without needing to learn the internals.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides a scalable generic framework that enables the rapid development and hosting of stream processing algorithms. The architecture hides the complexity involved in managing active connections to data sources, aggregates the demand on a data stream (e.g., a single connection for all stream algorithms, rather than each algorithm having its own connection), provides per-algorithm stream throttling so that individual algorithms do not get overloaded, employs an internal web service for publishing algorithm results to other production services, provides detailed logging and instrumentation for diagnosing performance and troubleshooting problems, implements a plug-in architecture for feed readers and stream algorithms, and ensures that algorithms always receive fresh items from the data feeds to which the algorithms are subscribed.

The architecture is a lossy realtime processing system that discards data in order to stay current, rather than letting a backlog form when an algorithm gets backed up. In one implementation, the architecture only operates in stream processing mode and does not perform re-querying of parts of the stream that have already passed. For each algorithm, the feed items are randomly sampled at the fastest rate the given algorithm can process them.

Reference is now made to the drawings, wherein like reference numerals are used to refer to like elements throughout. In the following description, for purposes of explanation, numerous specific details are set forth in order to provide a thorough understanding thereof. It is evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
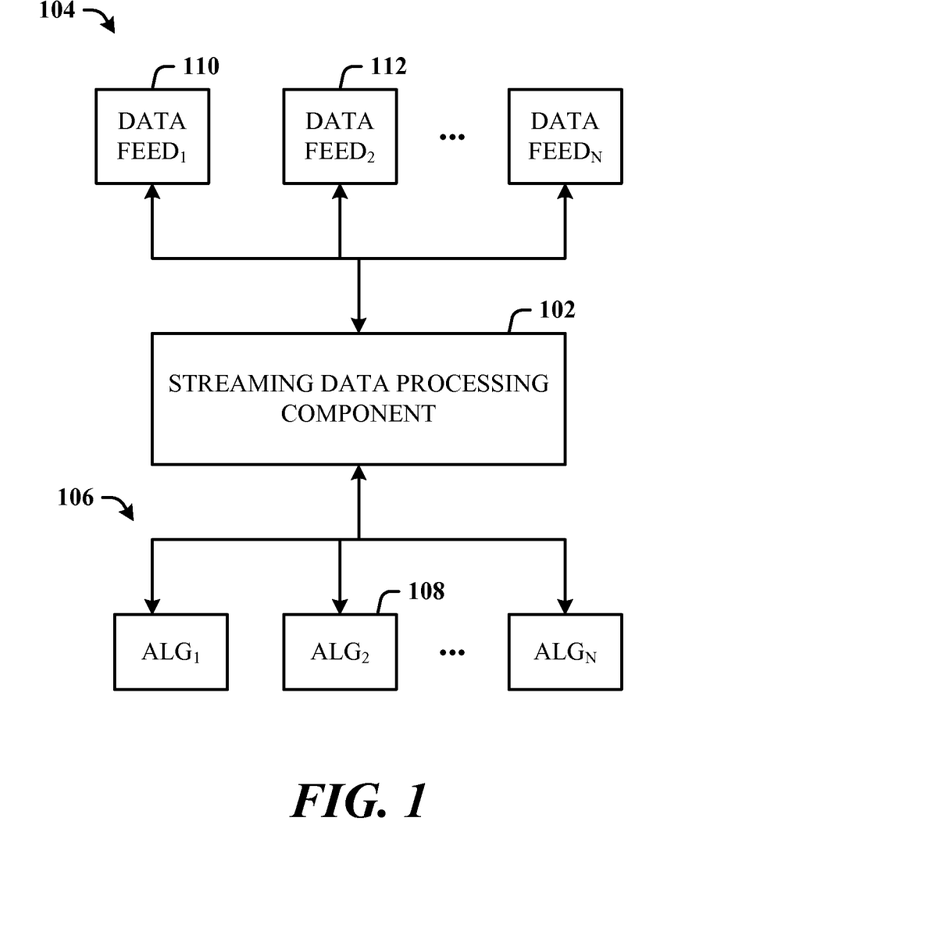
FIG. 1 illustrates a system in accordance with the disclosed architecture.

FIG. 1 illustrates a system 100 in accordance with the disclosed architecture. The system 100 includes a streaming data processing component 102 that receives streaming data from streaming data feeds 104 and performs lossy per-algorithm stream throttling of streaming data feeds 104 so that the stream processing algorithms 106 receive the most recent data from the streaming data feeds 104. The stream processing algorithms 106 can include an algorithm (e.g., an algorithm 108) that can receive streaming data from one or more data feeds such as a first data feed 110 and a second data feed 112. The stream processing algorithms 106 can include an algorithm (e.g., algorithm 108) that provides one or more outputs. The streaming data processing component 102 provides realtime streaming data for each algorithm (of the algorithms 106) to process.

Figure 2:
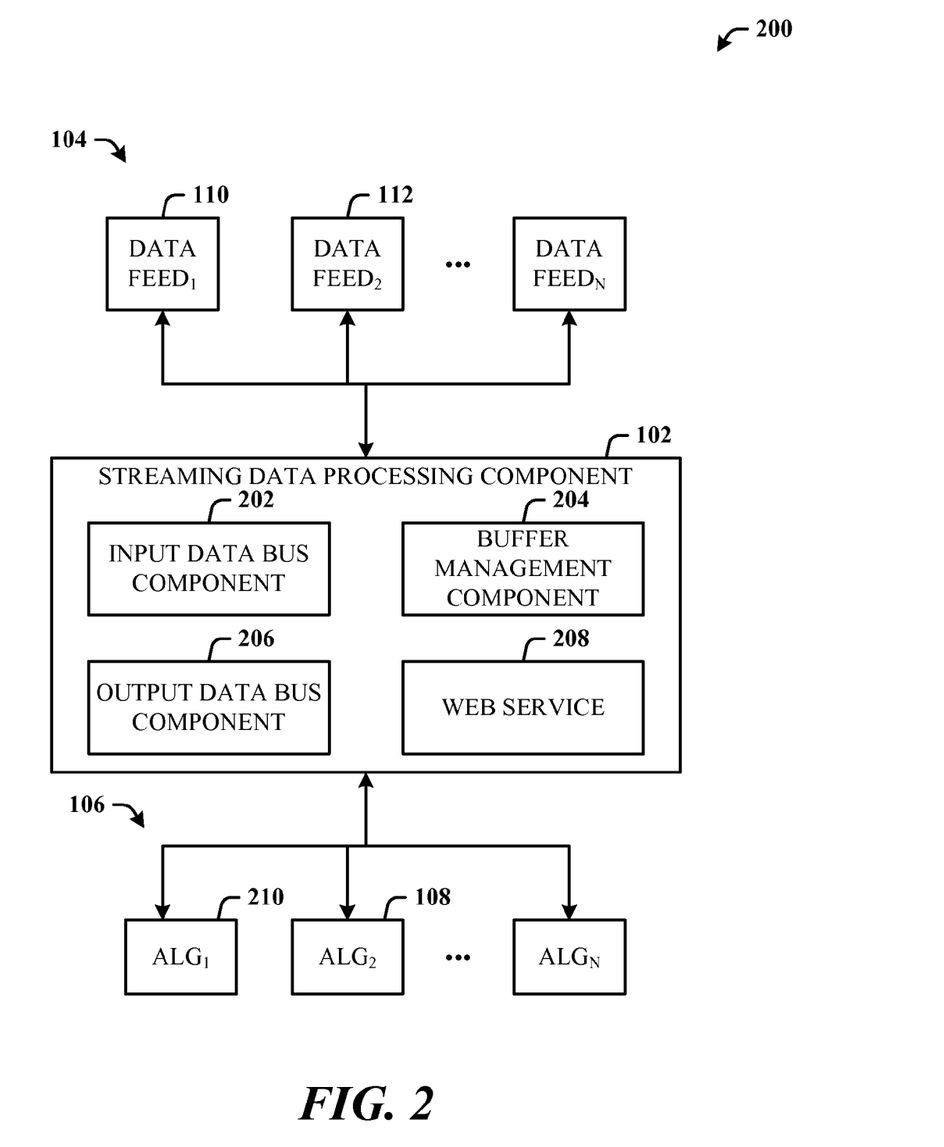
FIG. 2 illustrates a more detailed exemplary implementation of a stream processing system.

FIG. 2 illustrates a more detailed exemplary implementation of a stream processing system 200. The system 200 includes the streaming data processing component 102 that receives streaming data from streaming data feeds 104 and performs lossy per-algorithm stream throttling of the streaming data feeds 104 to enable stream processing algorithms 106 to receive (e.g., always) the most recent data from the streaming data feeds 104.

In this implementation, the streaming data processing component 102 further comprises an input data bus component 202 that consumes the data feeds 104 and routes the streaming data to the algorithms 106. The streaming data processing component 102 can also employ a buffer management component 204 that monitors buffer consumption for each algorithm and manages data flow to maintain realtime stream processing in one or more of the algorithms 106. An output data bus component 206 processes algorithm output into result sets. A web service 208 enables retrieval of the results sets by consuming systems.

The stream processing algorithms 106 can include an algorithm (e.g., algorithm 108) that receives streaming data from one or more data feeds and/or provides one or more outputs. The output data bus component 206 publishes the result sets to the web service 208 and to the input data bus component 202. The output data bus component 206 manages expiration policies defined for each result set. The input data bus component 202 enables an algorithm (e.g., algorithm 108) to subscribe to at least one of a data feed (e.g., data feed 110) or an output of another algorithm (e.g., algorithm 210).

Figure 3:
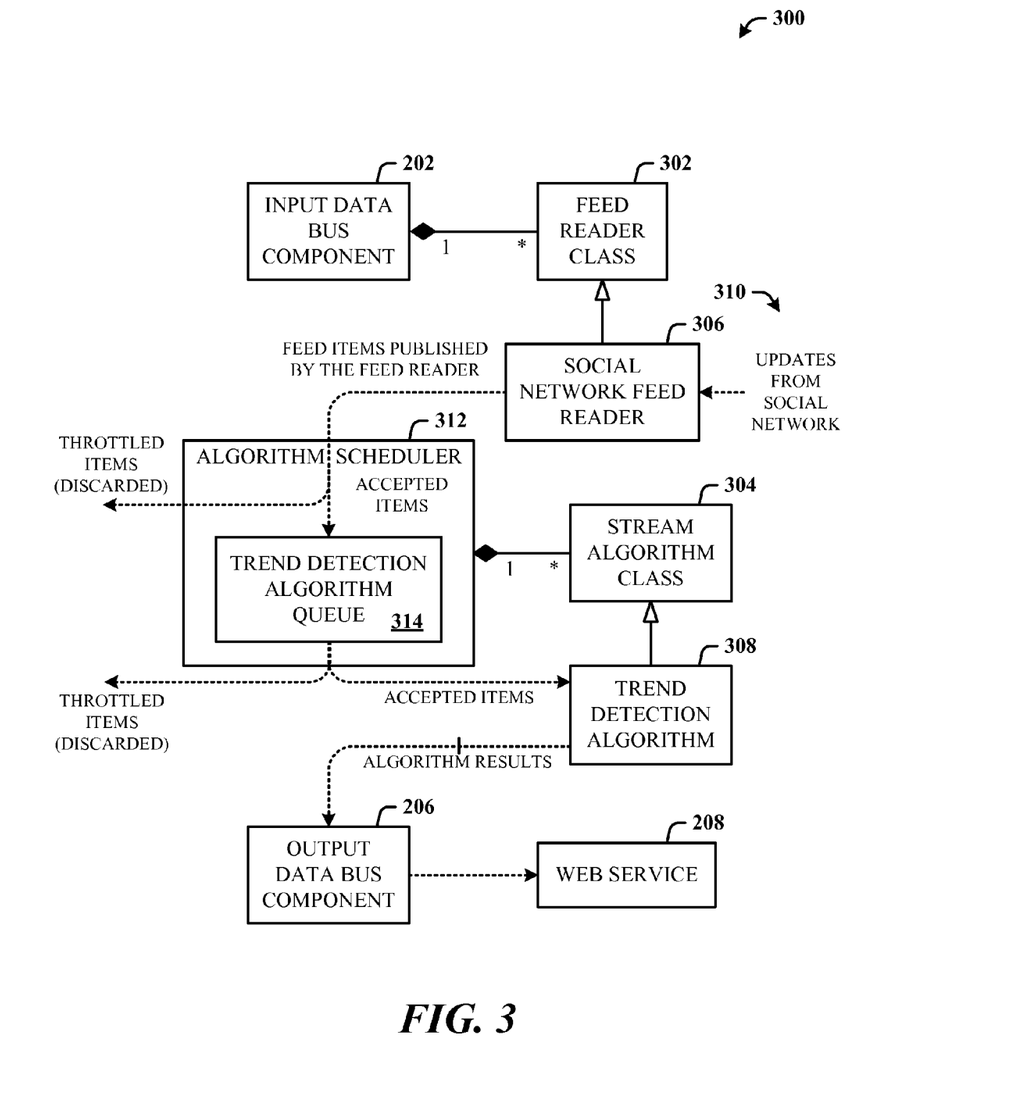
FIG. 3 illustrates a class diagram for an exemplary stream processing high-level architecture.

FIG. 3 illustrates a class diagram 300 annotated with dotted-line arrows showing the data flow between classes for an exemplary stream processing high-level architecture. The diagram 300 shows example implementations of a feed reader abstract class 302 and a stream algorithm abstract class 304 respectively named social network feed reader 306 and trend detection algorithm 308. In this example implementation, the social network feed reader 306 receives social network content (e.g., text, message, or update) (at 310) from a social network and produces one feed item for each received message. The trend detection algorithm 308 subscribes to the social network feed reader 306 (the trend detection algorithm 308 receives the feed items produced).

The data flow is shown by the dotted-lined arrows on the diagram. In particular, these arrows show a two-stage mechanism algorithm scheduler 312 for throttling the stream rates. The rate of a data stream is the number of individual items transmitted in the data stream in a predetermined time span (e.g., one second). The first stage (before adding feed items to a queue 314) uses random sampling to throttle the stream rate entering the queue 314. Thus, when the algorithm scheduler 312 estimates that an algorithm (e.g., algorithm 108 of FIG. 1) can handle "X" percent of the streaming data items, then the algorithm scheduler 312 randomly selects "100 minus X" percent of the streaming data items and discards them, thus lowering the stream rate to exactly what the algorithm can handle.

The second stage (after drawing feed items from the queue) involves a second round of throttling that handles data bursts, which happen too quickly for the first throttling mechanism to handle. Such a burst can happen because the algorithm scheduler 312 estimates X in intervals (e.g., once every three seconds). If the stream rate increases dramatically in-between estimates, then a large number of streaming data items may be added to the queue before the estimate of X is adjusted.

This two stage mechanism of the algorithm scheduler 312 ensures that the queue size is small, which in turn ensures that the stream algorithms are able to process feed items within a bounded amount of time (e.g., within three seconds) of entering the system.

As previously described, and as shown in the class diagram, the disclosed stream processing architecture includes the input data bus component 202, the algorithm scheduler 312 (referred to as part of the buffer management component 204 of FIG. 2), the output data bus component 206, and the web service 208. The input data bus component manages the consuming data feeds, and then making the feed data available to the algorithms (e.g., algorithms 106). The input data bus component 202 enables an algorithm (of the algorithms 106) to subscribe to multiple feeds (of the data feeds 104). The input data bus component 202 accomplishes this by internally multiplexing the feed items from the multiple feeds to every subscriber of that feed.

The algorithm scheduler 312 processes feed data items from the data feeds asynchronously. Thus, a large backlog can accumulate if feed items are received at a rate that exceeds a given algorithm's processing rate. The algorithm scheduler 312 manages this situation by automatically monitoring buffer consumption for each algorithm and throttling the flow to that algorithm so that the buffer input rate equals the buffer consumption rate for that algorithm. A simplified example of the throttling mechanism of the algorithm scheduler 312 is the following: if the algorithm can only handle 20% of the stream before being overloaded, then the algorithm scheduler thread randomly selects 20% of the items in the stream and discards the rest.

The output data bus component 206 processes algorithm output and organizes the output into groups (e.g., referred to as result sets). The output data bus component 206 publishes the result sets both to the web service 208, and back to the input data bus component 202 for any algorithms that subscribe to the result sets. The output data bus component 206 also manages the expiration policies defined for each result set.

The built-in web service 208 enables other systems to programmatically retrieve result sets, and also provides an API (application program interface) for retrieving trace/statistics information.

Put another way, the input data bus component 202 is responsible for managing each feed reader class 302. Each feed reader runs in its own thread and publishes the feed data it produces to the algorithm scheduler. As previously described, the algorithm scheduler 312 enables algorithm subscriptions to one or more feeds by internally multiplexing the feed items to every subscriber.

The algorithm scheduler 312 processes stream items (e.g., asynchronously) and monitors buffer consumption for each algorithm to prevent algorithm overloading by throttling (e.g., by random sampling) the flow so that the buffer input rate equals the buffer consumption rate. If a given algorithm can only handle a fixed percentage of the subscribed stream, then the scheduler 312 randomly selects no more than the fixed percentage of the items in the stream and discards the rest. Issues related to input stream volatility, algorithm rate volatility, convergence to a stable throttle rate without oscillating, etc., are managed as well.

The throttling mechanism can be implemented for stability under higher rates by increasing the frequency of stream rate estimations.

In an alternative embodiment, the algorithm scheduler 312 also owns the algorithm threads and has the ability to throttle thread execution (e.g., by imposing sleep or wait periods, if a particular thread is overloading the system). If a particular thread is throttled, then the algorithm scheduler 312 will notice (by observing the reduced buffer consumption) and throttle the rates accordingly.

The output data bus component 206 manages activities related to output processing. The output data bus component 206 receives new output from the algorithms and executes the expiration policies defined for each result set. The result sets are maintained as in-memory so that the web service 208 can fulfill the requests very quickly. In an alternative implementation, the result sets can be persisted to a storage medium (e.g., a hard drive) and retrieved directly without going through the web service 208.

The web service 208 can provide one or more API's. A result API is provided for retrieving algorithm results and retrieving trace and statistics information. The results API returns a list of result types for which the web service 208 can provide results. For example, one result type can be a social network trigger for a given social network (meaning that the web service 208 is capable of returning a list of trigger terms for that given social network).

The results API also returns a particular result set that corresponds to one of the available result types. The entire result set is returned. Each result set is associated with an expiration strategy that controls the number of results to a manageable size. The expiration strategies include round robin, expiration time, and replace-all-at-once. With respect to round robin, a FIFO (first in-first out) buffer is employed with a capped size of n items. When the buffer is full, an item is removed before another item is added. With respect to expiration time, each result has an expiration time. After the time has passed, the item is deleted. Under replace-all-at-once, the current result set is replaced entirely by a new result set.

In an alternative embodiment, a management API can be further employed to enable/disable/install stream algorithms, and to set algorithm priorities and change parameters.

Following is a specific application of the disclosed architecture to the Twitter™ social network.

An algorithm trigger service analyzes tweets in realtime and publishes a list of query triggers based on the hot topics of the moment. Another service uses this list to decide when to show an answer card containing tweets on the search engine results page (SERP). This can be implemented using plug-ins and a custom configuration file in accordance with the disclosed architecture. The plug-ins can include one feed reader plug-in and two stream algorithm plug-ins. More specifically, a feed reader plug-in receives all status updates from Twitter and one streaming algorithm plug-in computes a list of query triggers. Both of the above plug-ins is a concrete implementation of either a feed reader interface and/or stream algorithm interface, as described hereinabove. Both interfaces can be provided by a DLL (dynamic-link library).

Following is an example XML (extended markup language) configuration file (excluding the global settings):

```
<assemblies>
    <assembly name="TwitterUpdateFeedReader" type="reader"
        dll="Stream.TwitterUpdateFeedReader,TwiggFeedReaders.dll" >
    </assembly>
    <assembly name="TwitterTriggerAlgorithm" type="algorithm"
        dll="TwitterTools.TwitterTriggerAlgorithm,TriggerAlgorithms.dll"
        />
</assemblies>
<subscriptions>
    <subscription feed="TwitterUpdateFeedReader" algorithm=
"TwitterTriggerAlgorithm"/>
</subscriptions>
```

The "assemblies" element indicates where to find the plug-ins, the types of objects, and the arguments. The "subscriptions" element specifies the feeds to which each algorithm is subscribed. In this example, there is only one feed reader plug-in. However, it is possible to have many feed readers to which many different streams algorithms are subscribed. It is also possible for a stream algorithm to subscribe to multiple feed readers.

Once the configuration file is finished, other services are configured to retrieve the list of query triggers. The above algorithm publishes results with a unique identifier. The results are collected and organized based on the identifier.

```
<?xml version="1.0" encoding="us-ascii"?>
<ResultSet resultIdentifier="trigger.link.1min">
    <Properties>
        <Property name="up-since" value="20xx-07-14 01:44:01Z" />
    </Properties>
    <Results>
        <Result payload="tix and more 8.056" />
        <Result payload="breakingnews man 16.408" />
        <Result payload="18 monkeys smuggled 17.193" />
        <Result payload="phone users do battle 6.072" />
```

The result element format is flexible. The example above shows a snippet of the simplest option—an XML element with a single payload attribute. Other options range from a result object with any number of custom attributes to an object that can write its own XML format.

Another implementation of the disclosed architecture is for location-based trend/trigger/hot-topic detection. This can be accomplished using a filter parameter of the subscription configuration element. If the tweets coming from Twigg are annotated with location information, it is possible to host one algorithm per geographic region. For example, one algorithm can connect to a Twigg feed reader with a filter that passes only tweets in the San Francisco area, while another algorithm performs the same way for tweets in the New York area. This can be accomplished for any number of (potentially overlapping) geographic regions. As previously described, only one connection to the streaming data source would be needed to accomplish this.

Following is an example status page, the purpose of which is to provide a quick overview of running instance.

```
<Status buildLabel="63xxx9" machineName="name" port="816"
        serviceName="Search.B" bindingName="B">
    <Readers>
    <Reader ident="feed.twitter.updates">
    rate=xxx items/sec;
    CreatedAtAvgLag=2.4 sec; ReceivedAtAvgLag=1.6 sec
    </Reader>
    </Readers>
    <Algorithms>
    <Algorithm ident="algo.trigger.tweet" runningSince="20xx-07-13
18:41:04Z">
    receive-rate=297.1; accept-rate=297.1; consume-rate=268.1;
    backlog=0; throttle=1.0; spillway=0.0000;
    </Algorithm>
    </Algorithms>
    <ResultSets>
    <trigger.twitter.1min>rate=16.2 items/sec;</trigger.twitter.1min>
    </ResultSets>
</Status>
```

In the Algorithms section, the receive-rate is the items/sec received from the feed reader(s) to which the algorithm is subscribed. The accept-rate is the items/sec accepted into the algorithms queue. This number can be less than the receive-rate if throttling is active (i.e., if throttle <1). The throttle value is the percentage of received items that are accepted into the queue. The consume-rate is the items/sec processed by the algorithm. This number can be lower than the receive-rate when the spillway is active (i.e., spillway >0). The spillway value is the percentage of items that are discarded when items are drawn from the queue.

The spillway and throttle mechanisms are used by the framework to ensure that each algorithm receives only the number of items that it can handle without falling behind so that the algorithm receives the freshest possible items from the feed. The backlog value is the number of items in the algorithm's queue. This value is typically zero when an algorithm is fully keeping up with the feed.

In yet another alternative implementation, the disclosed architecture can be employed to support not only the realtime lossy scenario, but also the non-realtime lossless scenario. For example, configuration can be in lossy mode, which sets the maximum queue size to be very small (e.g., five items). This causes items to be discarded whenever there is even a small backlog, essentially guaranteeing that the items that are not thrown out are processed in realtime.

At the other end of the spectrum, a configuration option places the system into lossless mode (no items will be discarded). This sacrifices realtime or near-realtime processing. When a large backlog occurs, new items that are received are not processed until the system works through the queue. This delay can be arbitrarily long depending on the backlog. However, a limit can be employed such that if the input rate exceeds the algorithm's maximum processing rate, beyond a specified time duration, then the memory is depleted and queue items are discarded.

An optimum operating point may be somewhere in-between the two extremes. A typical configuration in this compromise mode can allow the queue to grow to approximately N seconds worth of items (e.g., the maximum number of items that the algorithm can process in N seconds). This means that under normal conditions the algorithm will never receive items older than N seconds. For the algorithms that compute trends, N can be typically five seconds. For the optimum value of N, the compromise mode provides near-realtime processing and minimal data loss.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
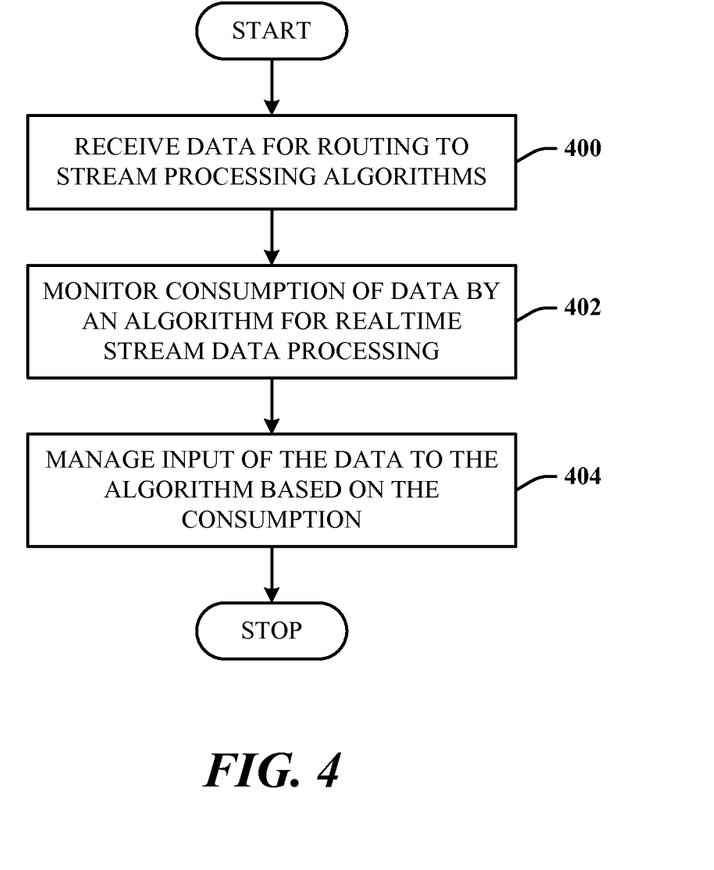
FIG. 4 illustrates a method in accordance with the disclosed architecture.

FIG. 4 illustrates a method in accordance with the disclosed architecture. At 400, data is received for routing to stream processing algorithms. At 402, consumption of data by an algorithm is monitored for realtime stream data processing. At 404, input of the data to the algorithm is managed (e.g., throttled) based on the consumption.

Figure 5:
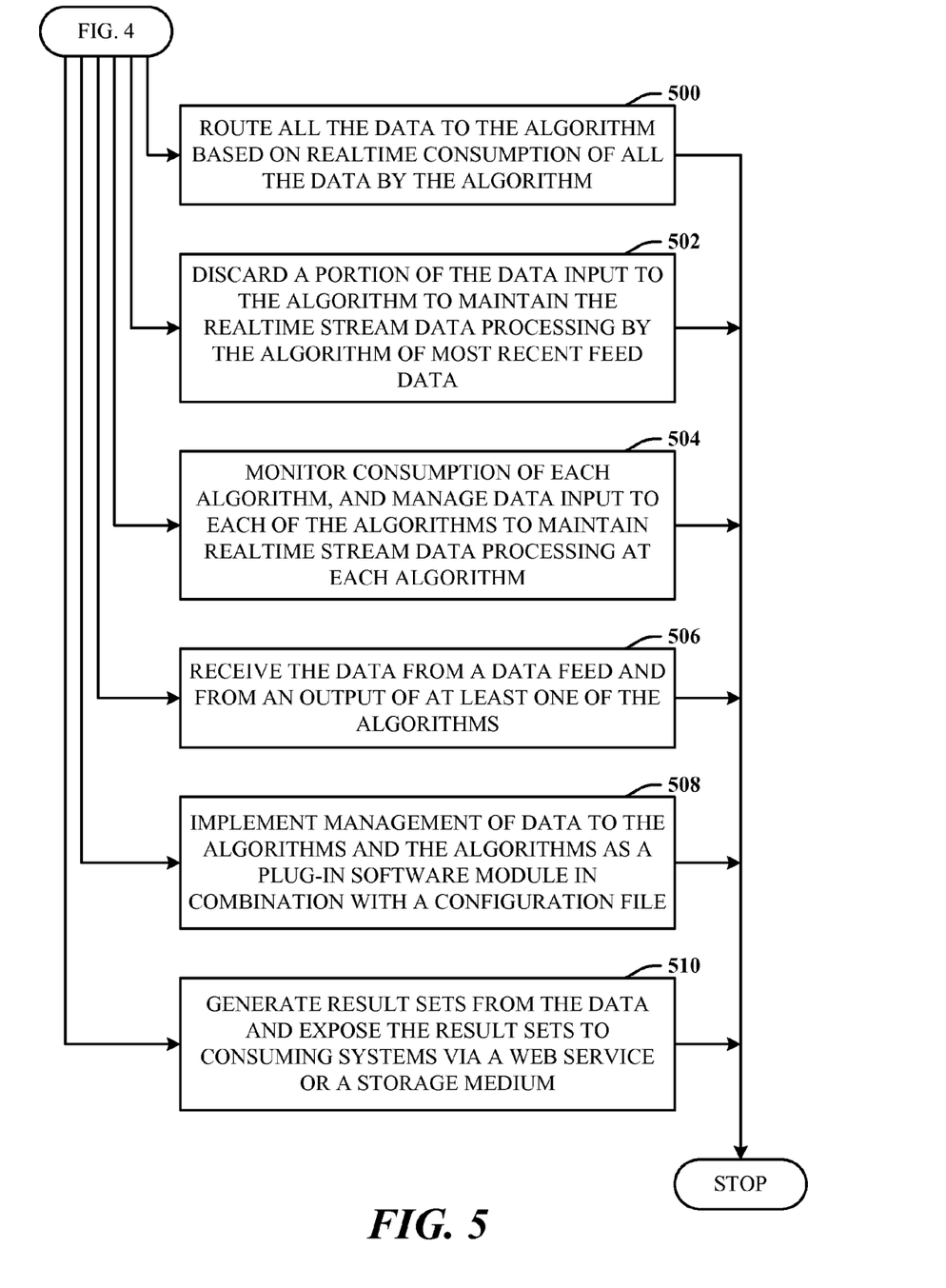
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, all the data is routed to the algorithm based on realtime consumption of all the data by the algorithm. At 502, a portion of the data input to the algorithm is discarded to maintain the realtime stream data processing by the algorithm. At 504, consumption of each algorithm is monitored, and data input to each of the algorithms is managed to maintain realtime stream data processing at each algorithm. At 506, the data is received from a data feed and from an output of at least one of the algorithms. At 508, management of data to the algorithms and the algorithms is implemented as a plug-in software module in combination with a configuration file. At 510, result sets are generated from the data (e.g., social network data), and the result sets are exposed to consuming systems via either a web service or a storage medium (e.g., a hard drive).

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
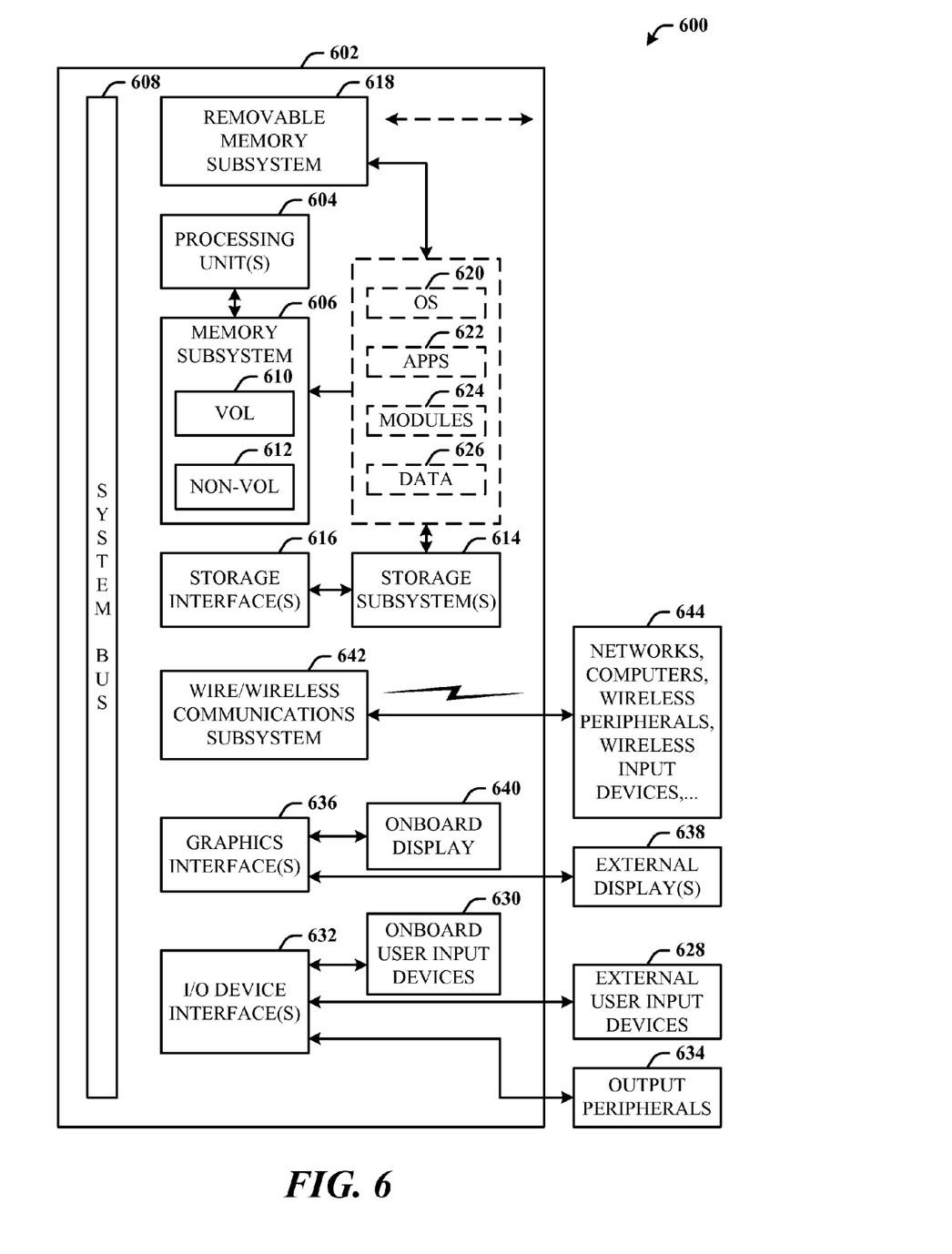
FIG. 6 illustrates a block diagram of a computing system that executes per-algorithm stream processing and management in accordance with the disclosed architecture.

Referring now to FIG. 6, there is illustrated a block diagram of a computing system 600 that executes per-algorithm stream processing and management in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include entities and components of the system 100 of FIG. 1, entities and components of the system 200 of FIG. 2, the clad diagram 300 of FIG. 3, and the methods represented by the flowcharts of FIGS. 4 and 5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a streaming data processing component that receives streaming data from streaming data feeds and performs lossy per-algorithm stream throttling of streaming data feeds to enable stream processing algorithms to receive most recent data from the streaming data feeds, the streaming data processing component including an output data bus component that
   (i) processes algorithm output into result sets and
   (ii) manages expiration policies defined for each result set; and
   a microprocessor that executes computer-executable instructions associated with the streaming data processing component.

2. The system of claim 1, wherein the stream processing algorithms include an algorithm that receives streaming data from one or more data feeds.

3. The system of claim 1, wherein the stream processing algorithms include an algorithm that provides one or more outputs.

4. The system of claim 1, wherein the streaming data processing component provides realtime streaming data for each algorithm to process.

5. The system of claim 1, wherein the streaming data processing component includes an input data bus component that consumes the data feeds and routes the streaming data to the algorithms.

6. The system of claim 1, wherein the streaming data processing component includes a buffer management component that monitors buffer consumption for each algorithm and manages data flow to maintain realtime stream processing in one or more of the algorithms.

7. The system of claim 1, wherein the streaming data processing component includes a web service that enables retrieval of the results sets by consuming systems.

8. A computer-implemented system, comprising:
   a streaming data processing component that receives streaming data from streaming data feeds and performs lossy per-algorithm stream throttling of streaming data feeds to enable stream processing algorithms to receive most recent data from the streaming data feeds, the streaming data processing component further comprising:
   an input data bus component that consumes the data feeds and routes the streaming data to the algorithms;
   a buffer management component that monitors buffer consumption for each algorithm and manages data flow to maintain realtime stream processing in one or more of the algorithms;
   an output data bus component that processes algorithm output into result sets and manages expiration policies defined for each result set; and
   a web service that enables retrieval of the results sets by consuming systems; and
   a microprocessor that executes computer-executable instructions associated with the streaming data processing component.

9. The system of claim 8, wherein the stream processing algorithms include an algorithm that at least one of receives streaming data from one or more data feeds or provides one or more outputs.

10. The system of claim 8, wherein the output data bus component publishes the result sets to the web service and to the input data bus component.

11. The system of claim 8, wherein the input data bus component enables an algorithm to subscribe to at least one of a data feed or an output of another algorithm.

12. A computer-implemented method, comprising acts of:
   receiving data for routing to stream processing algorithms;
   monitoring consumption of data by an algorithm for real-time stream data processing;
   managing, using lossy throttling, input of the data to the algorithm based on the consumption by performing lossy per-algorithm stream throttling of the received data to enable the stream processing algorithms to receive most recent data from the received data;
   processing algorithm output into result sets and managing expiration policies defined for each result set; and
   utilizing a processor that executes instructions stored in memory to perform at least one of the acts of monitoring, processing or managing.

13. The method of claim 12, further comprising routing all the data to the algorithm based on realtime consumption of all the data by the algorithm.

14. The method of claim 12, further comprising discarding a portion of the data input to the algorithm to maintain the realtime stream data processing by the algorithm of most recent feed data.

15. The method of claim 12, further comprising monitoring consumption of each algorithm, and managing data input to each of the algorithms to maintain realtime stream data processing at each algorithm.

16. The method of claim 12, further comprising receiving the data from a data feed and from an output of at least one of the algorithms.

17. The method of claim 12, further comprising implementing management of data to the algorithms and the algorithms as a plug-in software module in combination with a configuration file.

18. The method of claim 12, further comprising generating result sets from the data and exposing the result sets to consuming systems via either a web service or a storage medium.

19. One or more computer-readable storage media encoded with processing instruction that, when executed by a processor, cause the execution of a method, the method comprising:
   receiving data for routing to stream processing algorithms;
   monitoring consumption of data by an algorithm for real-time stream data processing;
   managing, using lossy throttling, input of the data to the algorithm based on the consumption by performing lossy per-algorithm stream throttling of the received data to enable the stream processing algorithms to receive most recent data from the received data; and processing algorithm output into result sets and managing expiration policies defined for each result set.

* * * * *